US012292988B2

(12) United States Patent
Sonoda

(10) Patent No.: US 12,292,988 B2
(45) Date of Patent: May 6, 2025

(54) AUTOMATIC SPECIFICATION OF CONFORMING ACTIVITY HISTORY MEETING PREDETERMINED CORRELATION CONDITION

(71) Applicant: NEC Corporation, Tokyo (JP)

(72) Inventor: Kentaro Sonoda, Tokyo (JP)

(73) Assignee: NEC CORPORATION, Tokyo (JP)

(*) Notice: Subject to any disclaimer, the term of this patent is extended or adjusted under 35 U.S.C. 154(b) by 227 days.

(21) Appl. No.: 17/781,116

(22) PCT Filed: Dec. 20, 2019

(86) PCT No.: PCT/JP2019/050002
§ 371 (c)(1),
(2) Date: May 31, 2022

(87) PCT Pub. No.: WO2021/124538
PCT Pub. Date: Jun. 24, 2021

(65) Prior Publication Data
US 2022/0414248 A1 Dec. 29, 2022

(51) Int. Cl.
G06F 21/62 (2013.01)

(52) U.S. Cl.
CPC .................. G06F 21/6218 (2013.01)

(58) Field of Classification Search
CPC .......... G06F 21/6218; G06F 2221/034; G06F 21/577; H04L 63/1425; H04L 63/1433; H04L 63/145
See application file for complete search history.

(56) References Cited

U.S. PATENT DOCUMENTS

| 8,490,196 | B2* | 7/2013 | Lucangeli Obes | H04L 63/1433 726/25 |
| 9,369,431 | B1* | 6/2016 | Kirby | H04L 63/20 |
| 2011/0035803 | A1* | 2/2011 | Lucangeli Obes | H04L 63/1433 726/25 |
| 2011/0061104 | A1* | 3/2011 | Sarraute Yamada | H04L 43/50 726/23 |
| 2019/0098027 | A1* | 3/2019 | Wang | H04L 63/20 |

(Continued)

FOREIGN PATENT DOCUMENTS

| JP | 2009-064191 A | 3/2009 |
| JP | 2012-222457 A | 11/2012 |
| JP | 2017-010180 A | 1/2017 |

(Continued)

OTHER PUBLICATIONS

English translation of Written opinion for PCT Application No. PCT/JP2019/050002, mailed on Mar. 17, 2020.

(Continued)

*Primary Examiner* — Harunur Rashid

(57) ABSTRACT

In order to efficiently perform security inspection, an inspection support apparatus includes a reception processing section configured to receive information related to a plurality of activity histories for security inspections performed by a plurality of inspection apparatuses, a specifying section configured to specify a conforming activity history meeting a predetermined correlation condition, from the plurality of activity histories, and a generating section configured to generate information related to the conforming activity history.

9 Claims, 11 Drawing Sheets

(56) References Cited

U.S. PATENT DOCUMENTS

2020/0034536 A1* 1/2020 Tagomori .............. H04L 63/145
2020/0106792 A1* 4/2020 Louie .................... G06N 5/022

FOREIGN PATENT DOCUMENTS

JP  2019-091464 A  6/2019
WO  2019/079621 A1  4/2019

OTHER PUBLICATIONS

International Search Report for PCT Application No. PCT/JP2019/050002, mailed on Mar. 17, 2020.
Written opinion for PCT Application No. PCT/JP2019/050002, mailed on Mar. 17, 2020.

* cited by examiner

| MAC ADDRESS OF INSPECTION APPARATUS | IP ADDRESS OF INSPECTION APPARATUS | EXECUTION TIME | HISTORY TYPE | COMMAND EXECUTION HISTORY INFORMATION |
|---|---|---|---|---|
| 12:34:56:78:9a:bc | 10.10.10.1 | 2019.9.6 14:40:35 | EXECUTION COMMAND | ping |
| 12:34:56:78:9a:bc | 10.10.10.1 | 2019.9.6 14:41:12 | EXECUTION COMMAND | SHARE OF FILE AND PRINTER (ECHO REQUEST - ICMPv4 RECEIVE) |
| 12:34:56:78:9a:bc | 10.10.10.1 | 2019.9.6 14:41:12 | EXECUTION COMMAND | SHARE OF FILE AND PRINTER (ECHO REQUEST - ICMPv4 RECEIVE) |
| ... | ... | ... | ... | ... |

Fig. 3

| MAC ADDRESS OF INSPECTION APPARATUS | IP ADDRESS OF INSPECTION APPARATUS | EXECUTION TIME | HISTORY TYPE | HISTORY |
|---|---|---|---|---|
| 12:34:56:78:9a:bc | 10.10.10.1 | 2019.9.9 12:53:10 | INTERNET SEARCH | https://www.... |
| 12:34:56:78:9a:bc | 10.10.10.1 | 2019.9.9 12:54:12 | INTERNET SEARCH | https://www.... |
| 12:34:56:78:9a:bc | 10.10.10.1 | 2019.9.9 12:56:37 | INTERNET SEARCH | https://www.... |
| ... | ... | ... | ... | ... |

AUTOMATIC SPECIFICATION OF CONFORMING ACTIVITY HISTORY MEETING PREDETERMINED CORRELATION CONDITION

This application is a National Stage Entry of PCT/JP2019/050002 filed on Dec. 20, 2019, the contents of all of which are incorporated herein by reference, in their entirety.

BACKGROUND

Technical Field

The present invention relates to a management apparatus, a management method, and a program for managing information related to a security inspection.

Background Art

There are services performing security inspections for software, hardware, and systems. Companies or the like can use such services to grasp and take measures for security defects and vulnerabilities of software, hardware, systems the companies or the like possess.

The security inspection includes, in a case of divided into main two types, for example, a vulnerability inspection and a penetration test. The vulnerability inspection inspects whether or not a vulnerability is present in an operating system (OS) or an application used for the software, the hardware, and the systems. The penetration test performs an attack such as hacking or sensitive information stealing against the software, the hardware, and the systems to inspect a presence of a defect.

PTL 1 discloses a technique in which in order to improve a malware inspection support and defect detection accuracy, malware is deployed to a user capable of performing a malware inspection in a blockchain network to pay a reward depending on an inspection result by the user, for example.

CITATION LIST

Patent Literature

[PTL 1] JP 2019-091464 A

SUMMARY

Technical Problem

The vulnerability inspection, which often performs inspections mainly using an inspection tool or software, can substantially automatically perform the inspections. However, the security inspection possibly classified into the penetration test or the like may be often an inspection dependent on individual skills, and thus, the inspection tends to take much time.

For example, the technique disclosed in PTL 1 described above is a method for increasing the number of malware analysts to improve an efficiency, so is not a fundamental solution to an efficiency of a work dependent on individual skills.

As such, an example object of the present invention is to provide a management apparatus, a management method, and a program enabling a security inspection to be efficiently performed. Solution to Problem An example object of the present disclosure is to provide a management apparatus, a reception processing section configured to receive information related to a plurality of activity histories for security inspections performed by a plurality of inspection apparatuses; a specifying section configured to specify a conforming activity history meeting a predetermined correlation condition, from the plurality of activity histories; and a generating section configured to generate information related to the conforming activity history.

An example object of the present disclosure is to provide a management method, receiving information related to a plurality of activity histories for security inspections from a plurality of inspection apparatuses; specifying a conforming activity history that meets a predetermined correlation condition from the plurality of activity histories; and generating information related to the conforming activity history.

An example object of the present disclosure is to provide a program for causing a computer, receiving information related to a plurality of activity histories for security inspections from a plurality of inspection apparatuses; specifying a conforming activity history that meets a predetermined correlation condition from the plurality of activity histories; and generating information related to the conforming activity history.

Advantageous Effects of Invention

According to an example aspect of the present disclosure, it is possible to enable a security inspection to be efficiently performed. Note that the present disclosure may exert other advantageous effects instead of the above advantageous effects or together with the above advantageous effects.

BRIEF DESCRIPTION OF THE DRAWINGS

FIG. 3 is a diagram illustrating a concrete example of command execution history information 300 stored in the inspection support apparatus 100 (storage section 120);

FIG. 4 is a diagram illustrating a concrete example of Internet search history information 400 stored in the inspection support apparatus 100 (storage section 120);

FIG. 7 is a flowchart illustrating a flow of processing performed in the inspection management system 1a;

DESCRIPTION OF THE EXAMPLE EMBODIMENTS

Figure 1:
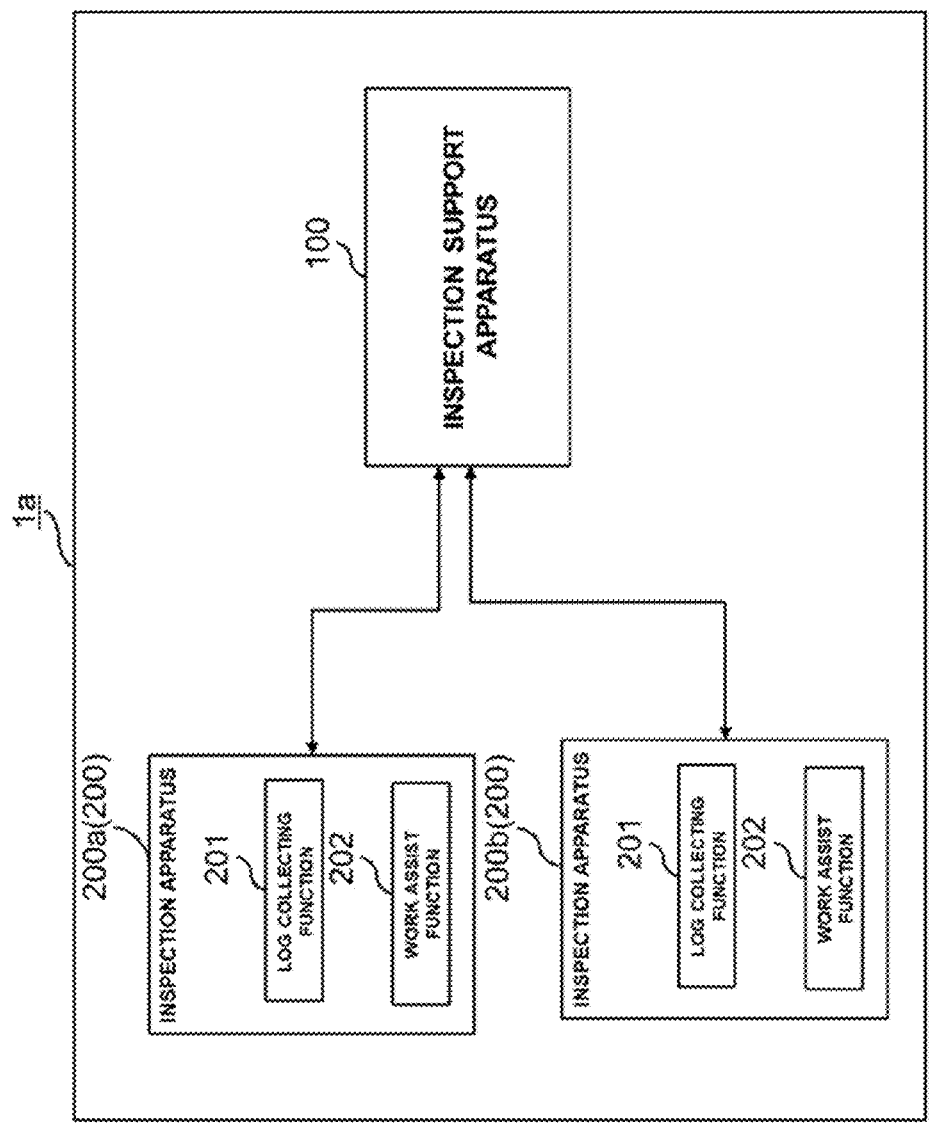
FIG. 1 is a block diagram illustrating an example of a schematic configuration of an inspection management system 1a according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments according to the Present Invention
2. First Example Embodiment
2.1. Configuration of Inspection Management System 1a
2.2. Configuration of Inspection Support Apparatus 100
2.3. Operation Example
3. Second Example Embodiment
3.1. Configuration of Inspection Apparatus 200
3.2. Operation Example
4. Third Example Embodiment
4.1. Configuration of Management Apparatus 1100
4.2. Operation Example
5. Other Example Embodiments

1. Overview of Example Embodiments according to the Present Invention

Firstly, an overview of example embodiments according to the present invention will be described.
(1) Technological Issue
There are services performing security inspections for software, hardware, and systems. Companies or the like can use such services to grasp and take measures for security defects and vulnerabilities of software, hardware, systems the companies or the like possess.

In a case of divided into main two types, for example, the security inspection includes a vulnerability inspection and a penetration test. The vulnerability inspection inspects whether or not a vulnerability is present in an operating system (OS) or an application used for the software, the hardware, and the systems. The penetration test performs an attack such as hacking or sensitive information stealing against the software, the hardware, and the systems to inspect a presence of a defect.

The vulnerability inspection, which often performs inspections mainly using an inspection tool or software, can substantially automatically perform the inspections. However, the security inspection possibly classified into the penetration test or the like may be often an inspection dependent on individual skills, and thus, the inspection tends to take much time.

As such, an example object of the present example embodiment is to efficiently perform the security inspection.
(2) Technical Features
In the example embodiments according to the present invention, information related to a plurality of activity histories for security inspections performed by a plurality of inspection apparatuses is received, a conforming activity history meeting a predetermined correlation condition is specified from the plurality of activity histories, and information related to the conforming activity history is generated.

This allows the security inspection to be efficiently performed, for example. Note that the technical features described above are merely a concrete example according to the example embodiments of the present invention, and of course, the example embodiments of the present invention are not limited to the technical features described above.

2. First Example Embodiment

A description will be given of a first example embodiment with reference to FIGS. 1 to 8.

2.1. Configuration of Inspection Management System 1a

With reference to FIG. 1, an example of a configuration of an inspection management system 1a according to the first example embodiment will be described. FIG. 1 is a block diagram illustrating an example of a schematic configuration of the inspection management system 1a according to the first example embodiment. Referring to FIG. 1, the inspection management system 1a includes an inspection support apparatus 100, and two inspection apparatuses 200a and 200b (hereinafter, referred to inspection apparatus 200 in a case of being collectively referred). Note that the inspection management system 1a may include three or more inspection apparatuses without being limited to two inspection apparatuses 200a and 200b.

In the inspection management system 1a as described above, the inspection apparatus 200 is an apparatus for a person performing an inspection (hereinafter, referred to as an inspector, not illustrated) to perform the inspection. For example, the apparatus may include a desktop PC, a notebook PC, a mobile terminal such as a smartphone, and the like. The inspection support apparatus 100 manages information transmitted from the inspection apparatus 200, as specifically described later.

2.2. Configuration of Inspection Support Apparatus 100

Figure 2:
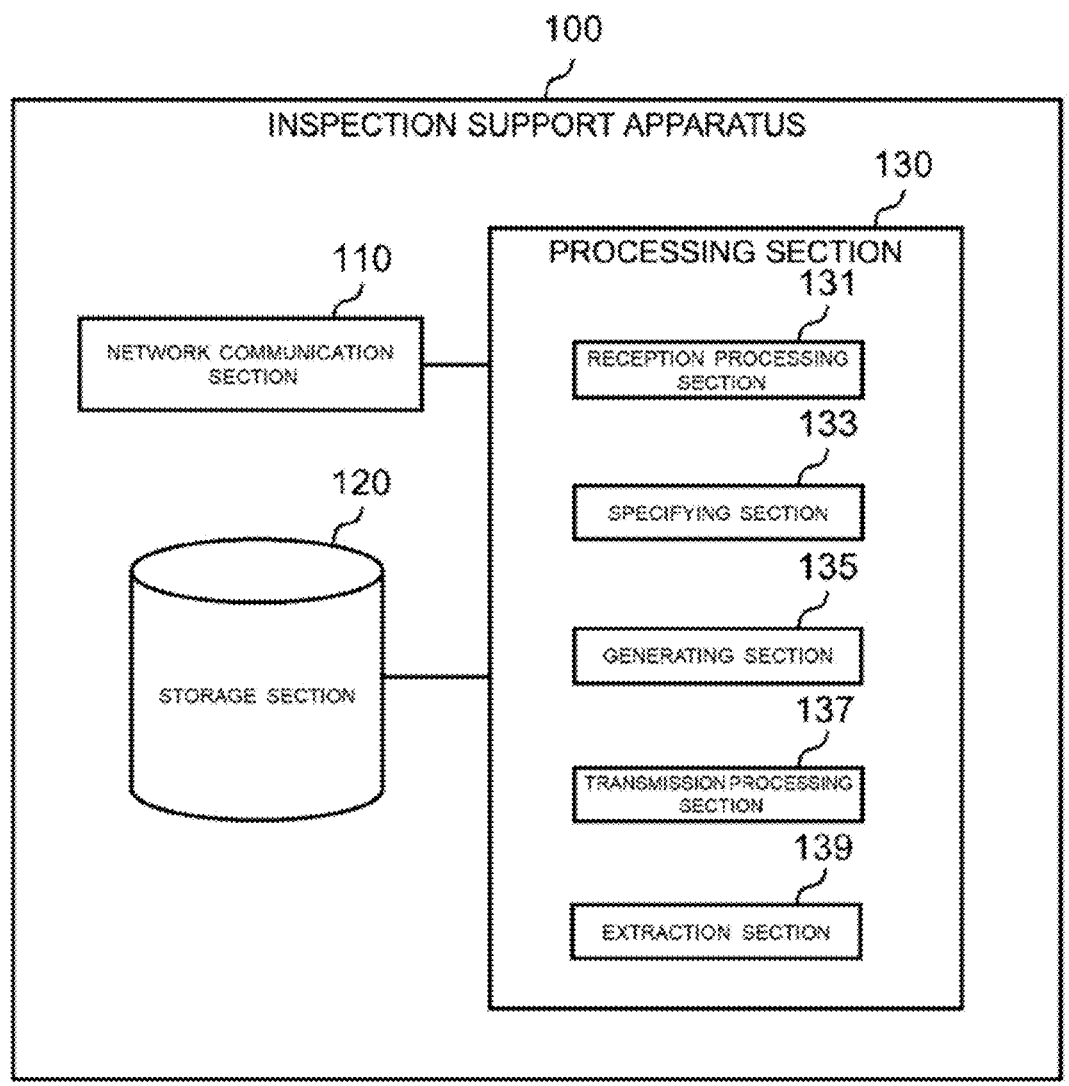
FIG. 2 is a block diagram illustrating an example of a schematic configuration of an inspection support apparatus 100.

FIG. 2 is a block diagram illustrating an example of a schematic configuration of the inspection support apparatus 100. Referring to FIG. 2, the inspection support apparatus 100 includes a network communication section 110, a storage section 120, and a processing section 130.
(1) Network Communication Section 110
The network communication section 110 receives a signal from a network and transmits a signal to the network.
(2) Storage Section 120
The storage section 120 temporarily or permanently stores programs (instructions) and parameters for operations of the inspection support apparatus 100 as well as various data. The programs include one or more instructions for the operations of the inspection support apparatus 100.
(3) Processing Section 130
The processing section 130 provides various functions of the inspection support apparatus 100. The processing section 130 includes a reception processing section 131, a specifying section 133, a generating section 135, a transmission processing section 137, and an extraction section 139. Note that the processing section 130 may further include constituent elements other than these constituent elements. In other words, the processing section 130 may also perform operations other than the operations of these constituent elements. Concrete operations of the reception processing section 131, the specifying section 133, the generating section 135, the transmission processing section 137, and the extraction section 139 will be described later in detail.

(4) Implementation Example

The network communication section 110 may be implemented with a network adapter and/or a network interface card, and the like. The storage section 120 may be implemented with a memory (e.g., a nonvolatile memory and/or a volatile memory) and/or a hard disk, and the like. The processing section 130 may be implemented with one or more processors. The reception processing section 131, the specifying section 133, the generating section 135, the transmission processing section 137, and the extraction section 139 may be implemented with the same processor or may be implemented with separate processors. The memory (storage section 120) may be included in the one or more processors or may be provided outside the one or more processors.

The inspection support apparatus 100 may include a memory configured to store programs (instructions) and one or more processors that can execute the programs (instructions). The one or more processors may execute the programs and thereby perform operations of the processing section 130 (operations of the reception processing section 131, the specifying section 133, the generating section 135, the transmission processing section 137, and/or the extraction section 139). The programs may be programs for causing the processor(s) to execute operations of the processing section 130 (operations of the reception processing section 131, the specifying section 133, the generating section 135, the transmission processing section 137, and/or the extraction section 139).

2.3. Operation Example

Next, an operation example according to the first example embodiment will be described.

According to the first example embodiment, the inspection support apparatus 100 (reception processing section 131) receives information related to a plurality of activity histories for security inspections performed by the plurality of inspection apparatuses 200. The inspection support apparatus 100 (specifying section 133) specifies a conforming activity history meeting a predetermined correlation condition from the plurality of activity histories. The inspection support apparatus 100 (generating section 135) generates information related to the conforming activity history.

According to the first example embodiment, the use of the information related to the conforming activity history allows the security inspection to be efficiently performed.

(1) Information related to Activity History

Activity History

Each of the plurality of activity histories includes information identifying an execution command for the security inspection. Each of the plurality of activity histories includes information related to an Internet search for the security inspection.

Specifically, the security inspection is an inspection for a security defect in a security attack against each of the plurality of inspection apparatuses.

Log Collecting

The information related to the activity history is acquired by each of the plurality of inspection apparatuses 200 and is received by the inspection support apparatus 100 (reception processing section 131) as described below, for example.

Firstly, the inspection apparatus 200 has a log collecting function 201 of collecting a command execution history or an Internet search history of the inspector. The log collecting function 201 is an application installed on the inspection apparatus 200, for example.

The inspection apparatus 200 (log collecting function 201) collects a command execution history in a command line install (CLI) every command execution. The inspection apparatus 200 (log collecting function 201) collects a search history file for the Internet search history every execution of search. The inspection apparatus 200 (log collecting function 201) may use an application such as a keylogger, for example, to collect the command execution history or the Internet search history.

The inspection apparatus 200 transmits, as the information related to the activity history, the command execution history and the Internet search history collected by the log collecting function 201 to the inspection support apparatus 100. The inspection apparatus 200 performs a work assist by a work assist function 202 for the inspector using the inspection apparatus 200 as described later.

Note that the log collecting function 201 and the work assist function 202 may be any form of applications installed on the inspection apparatus 200, or applications introduced into a server (not illustrated) located outside the inspection apparatus 200, or any other aspects.

The log collecting function 201 may include, besides the command execution history and the Internet search history, a program (executable file, source code). Examples of the program include an inspection tool and an individual inspection program of the inspector, for example.

Log Management

The information related to the activity history is transmitted from the inspection apparatus 200 to the inspection support apparatus 100 and stored in the inspection support apparatus 100 (storage section 120).

FIG. 3 is a diagram illustrating a concrete example of command execution history information 300 stored in the inspection support apparatus 100 (storage section 120). Referring to FIG. 3, the inspection support apparatus 100 (storage section 120) stores the command execution history information associated with information identifying the inspection apparatus (MAC address, IP address), a command execution time, and a history type.

For example, the command execution history information 300 as illustrated in FIG. 3 allows an inspection know-how of the inspector to be recognized that after a packet arrival by way of ping cannot be confirmed, a firewall in an operating system is configured to investigate a cause.

FIG. 4 is a diagram illustrating a concrete example of Internet search history information 400 stored in the inspection support apparatus 100 (storage section 120). Referring to FIG. 4, the inspection support apparatus 100 (storage section 120) stores the command execution history information associated with the information identifying the inspection apparatus (MAC address, IP address), the command execution time, and the history type.

For example, the Internet search history information 400 as illustrated in FIG. 4 allows an inspection know-how of the inspector to be recognized on what an order the Internet search is performed in, and so on.

(2) Specifying Conforming Activity History

The conforming activity history meeting a predetermined correlation condition specifically refers to the activity histories satisfying a relation of matching each other, or the activity histories satisfying a relation of being similar to each other on the basis of an evaluation scheme as described later.

To be more specific, the conforming activity history is specified by the inspection support apparatus 100 (specifying section 133) as below. Specifically, the inspection support apparatus 100 (specifying section 133) references the command execution history information and the Internet search history information stored in the storage section 120 to specify, from these pieces of the activity history information (logs), the activity history information having the relation of matching each other or the relation of being similar to each other as the conforming activity history. Here, the relation of being similar to each other of the activity history information (logs) may be automatically determined through an artificial intelligence or machine learning, for example. The relation of being similar to each other of the activity history information (logs) may be determined by use of an evaluation scheme evaluating an importance of a word such as term frequency-inverse document frequency (tf-idf). The relation of being similar to each other of the activity history information (logs) may be determined by any evaluation scheme without being limited to these evaluation schemes above.

The conforming activity information are performed by a plurality of inspectors, and thus, may be used as useful information to assist a work relating to the security inspection.

(3) Information Related to Conforming Activity History Information Generating

The information related to the conforming activity history may include information related to one or more subsequent activity histories performed for security inspections subsequent to the conforming activity history.

Figure 5:
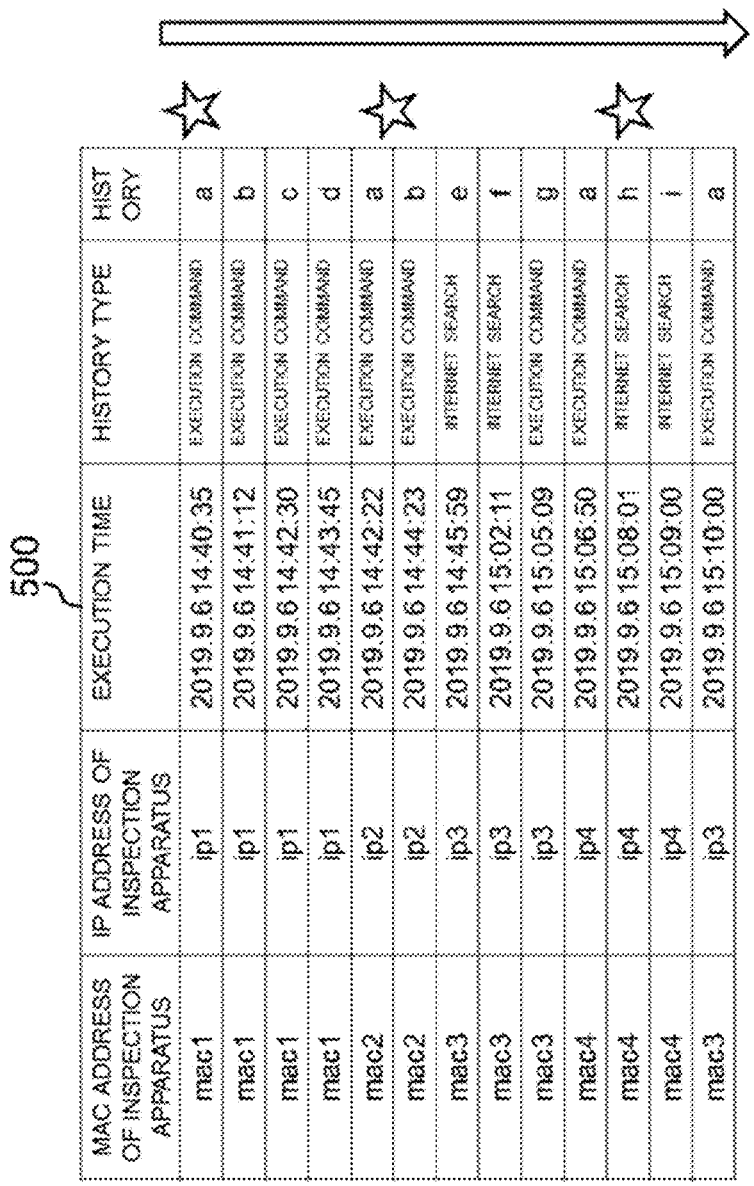
FIG. 5 is a diagram illustrating a concrete example of activity history information 500 performed by a plurality of inspection apparatuses 200 different from each other in an address (MAC address, IP address)

For example, FIG. 5 is a diagram illustrating a concrete example of activity history information 500 performed by a plurality of inspection apparatuses 200 different from each other in an address (MAC address, IP address). Referring to FIG. 5, for example, an execution command a performed by three inspection apparatuses 200 which are specified by mac addresses mac1, mac2, and mac4 is specified as the conforming activity information by the inspection support apparatus 100 (specifying section 133).

In this case, the inspection support apparatus 100 (generating section 135) generates information related to the conforming activity history from contents of subsequent history information subsequent to the execution command a. Specifically, the inspection support apparatus 100 (generating section 135) generates the information related to the conforming activity history information from information indicating an execution command performed by each of the inspection apparatuses 200 specified by the mac addresses mac1, mac2, and mac4 after the execution command a.

Note that the information related to the conforming activity history may include a predetermined number of execution commands (one execution command, and so on), for example, among the contents of the subsequent history information performed subsequent to the execution command a. For example, in a case that a predetermined number is one, the subsequent activity histories by the mac addresses mac1, mac2, and mac4 are execution commands b, b, and h immediately after the execution command a, respectively.

Information Transmitting

The inspection support apparatus 100 (transmission processing section 137) transmits the information related to the conforming activity history to one or more inspection apparatuses 200 among the plurality of inspection apparatuses 200.

For example, in a case of applying to an example as illustrated in FIG. 5, the inspection support apparatus 100 (transmission processing section 137) transmits, to a display section included in the inspection apparatus 200 as a transmission destination (for example, the inspection apparatus 200*a*), display data for displaying the execution command a performed by three inspection apparatuses 200 different from the inspection apparatus 200*a* and the execution commands performed next to the execution command a by three respective inspection apparatuses 200.

Figure 6:
FIG. 6 is a diagram illustrating a display screen example 600 displayed by way of display data transmitted by the inspection support apparatus 100 (transmission processing section 137)

FIG. 6 is a diagram illustrating a display screen example 600 displayed by way of the display data transmitted by the inspection support apparatus 100 (transmission processing section 137). For example, focusing on a case that the inspection apparatus 200*a* receives the display data described above from the inspection support apparatus 100, the inspection apparatus 200 (work assist function 202) displays, as illustrated in FIG. 6, the execution command a (conforming activity history) performed by three inspection apparatuses 200 other than the inspection apparatus 200*a* and the execution commands (subsequent history) performed next to the execution command a by these respective inspection apparatuses 200 on the display section included in the inspection apparatus 200*a*.

In this way, the inspection apparatus 200 (work assist function 202) can present the information related to the conforming activity history as information assisting a next action of the inspector. Then, a user (inspector) of the inspection apparatus 200*a* can utilize the activity history relating to the inspections performed in the past by other inspectors to efficiently perform the security inspection.

(4) Flow of Processing performed in Inspection Management System 1*a*

Figure 7:
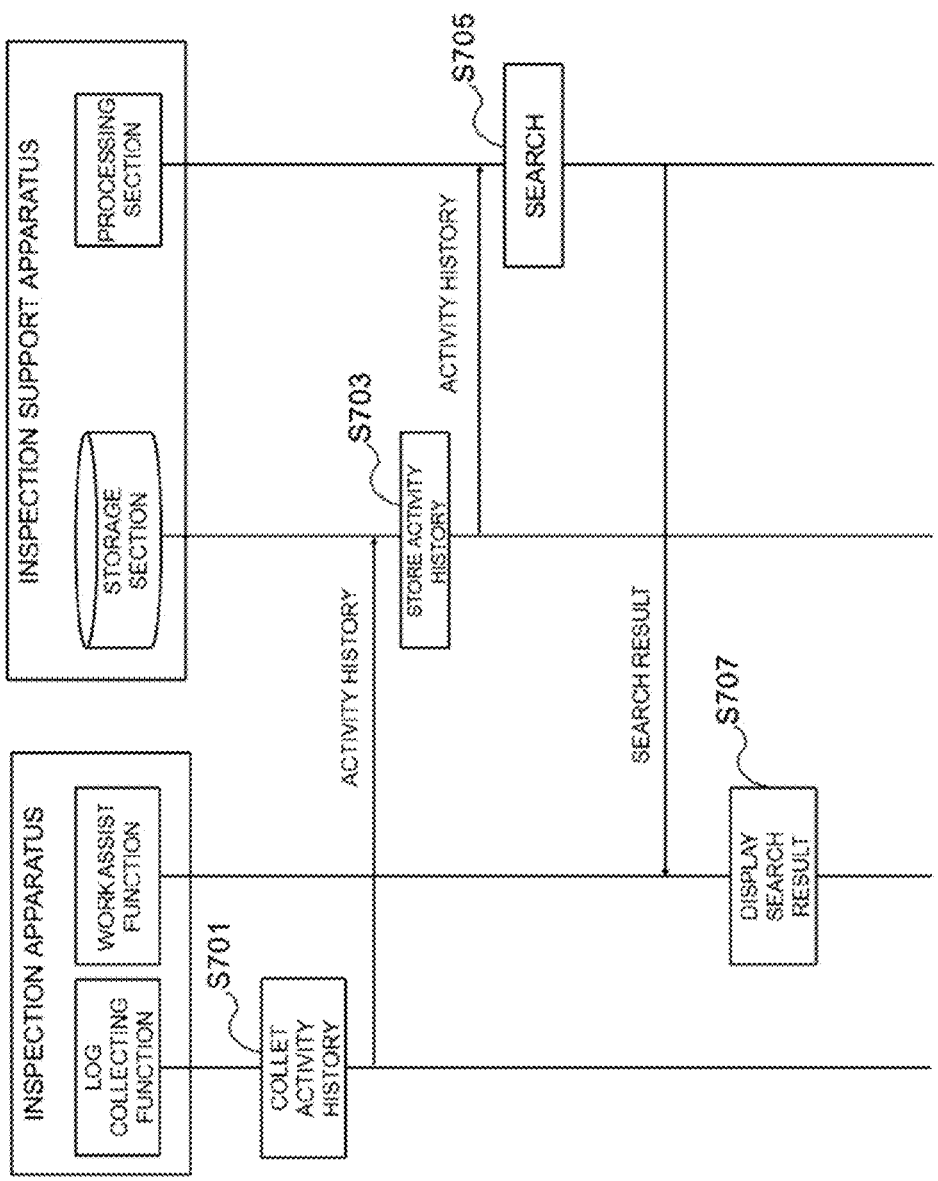

Next, with reference to FIG. 7, processing performed in the inspection management system 1*a* will be described. FIG. 7 is a flowchart illustrating a flow of the processing performed in the inspection management system 1*a*.

Referring to FIG. 7, first, the inspection apparatus 200 (log collecting function 201) collects the command execution history or the Internet search history of the inspector (S701). The collected activity history is transmitted from the inspection apparatus 200 to the inspection support apparatus 100.

Next, the inspection support apparatus 100 (storage section 120) stores the activity history that is received from the inspection apparatus 200 (S703). Next, the inspection support apparatus 200 (specifying section 133) accesses the storage section 120 and references the command execution history information and the Internet search history information stored in the storage section 120 to search for, from these pieces of the activity history information (logs), the confirming activity history (the information having the relation of matching each other or the relation of being similar to each other). Once the confirming activity history is successfully searched, the inspection apparatus 200 (generating section 135) generates the information related to the conforming activity history. Then, the generated information as information related to a search result is transmitted from the inspection support apparatus 100 to the inspection apparatus 200.

Next, the inspection apparatus 200 displays the information related to the search result received from the inspection support apparatus 100 on the display section (S707).

According to the processing illustrated in FIG. 7 above, the command execution history and the Internet search history accompanied by the inspection work of the inspector are collected. Then, for example, on a new command execution or Internet search, once the inspection support apparatus 100 references the command execution history and the Internet search history to successfully search for the conforming activity history, information related to a search result is presented to the inspector of the inspection apparatus 200. By doing so, according to the processing illustrated in the FIG. 7, the inspection work assist, in other words, the inspection work know-how of the inspectors can be shared.

(5) Processing with Information Related to Inspection Apparatus Taken into Account The inspection support apparatus 100 (for example, the generating section 135) may take information related to the inspection apparatus 200 into account, for example, to generate the information related to the conforming activity history. The information related to the inspection apparatus 200 may be the accumulated number of inspections of the security inspections performed by the inspection apparatus 200, or information related to an inspector performing an operation of the inspection apparatus 200 for performing the security inspection as described later, for example.

In this case, the inspection support apparatus 100 (extraction section 139) extracts one or more subsequent activity histories from two or more subsequent activity histories performed for the security inspections subsequently to the conforming activity history, based on the information related to each of the inspectors performing the security inspections corresponding to the respective subsequent activity histories. Then, the inspection support apparatus 100 (generating section 135) generates the information related to the conforming activity history from information related to one or more extracted subsequent activity histories.

For example, the inspection support apparatus 100 (extraction section 139) may extract one or more subsequent activity histories from two or more subsequent activity histories performed for the security inspections subsequently to the conforming activity history, based on the accumulated number of inspections by the inspection apparatus 200 performing the security inspections corresponding to the respective subsequent activity histories. For example, the inspection support apparatus 100 (extraction section 139) may use, as an extraction target, a subsequent activity history performed by the inspection apparatus 200 with the accumulated number of inspections by the inspection apparatus 200 exceeding a predetermined threshold.

The information related to the inspection apparatus 200 may include a proficiency level calculated based on an inspection history of the inspector performing an operation of the inspection apparatus 200 for performing the security inspection. For example, the proficiency level is calculated by the inspection apparatus 200, associated with the information related to the activity history, and transmitted to the inspection support apparatus 100.

In this case, the inspection support apparatus 100 (extraction section 139) extracts one or more subsequent activity histories from two or more subsequent activity histories performed for the security inspections subsequently to the conforming activity history, based on the proficiency level of the inspector operating the inspection apparatus 200 performing the security inspection corresponding to each of the subsequent activity histories. For example, the inspection support apparatus 100 (extraction section 139) may use, as an extraction target, a subsequent activity history performed by the inspector of which the proficiency level exceeds a predetermined threshold.

Furthermore, in a case that the extraction section 139 extracts two or more subsequent activity histories, the information related to the conforming activity history may include information related to two or more extracted subsequent activity histories, and information related to the proficiency level of the inspector operating the inspection apparatus 200 performing the security inspection corresponding to each of two or more extracted subsequent activity histories.

Figure 8:
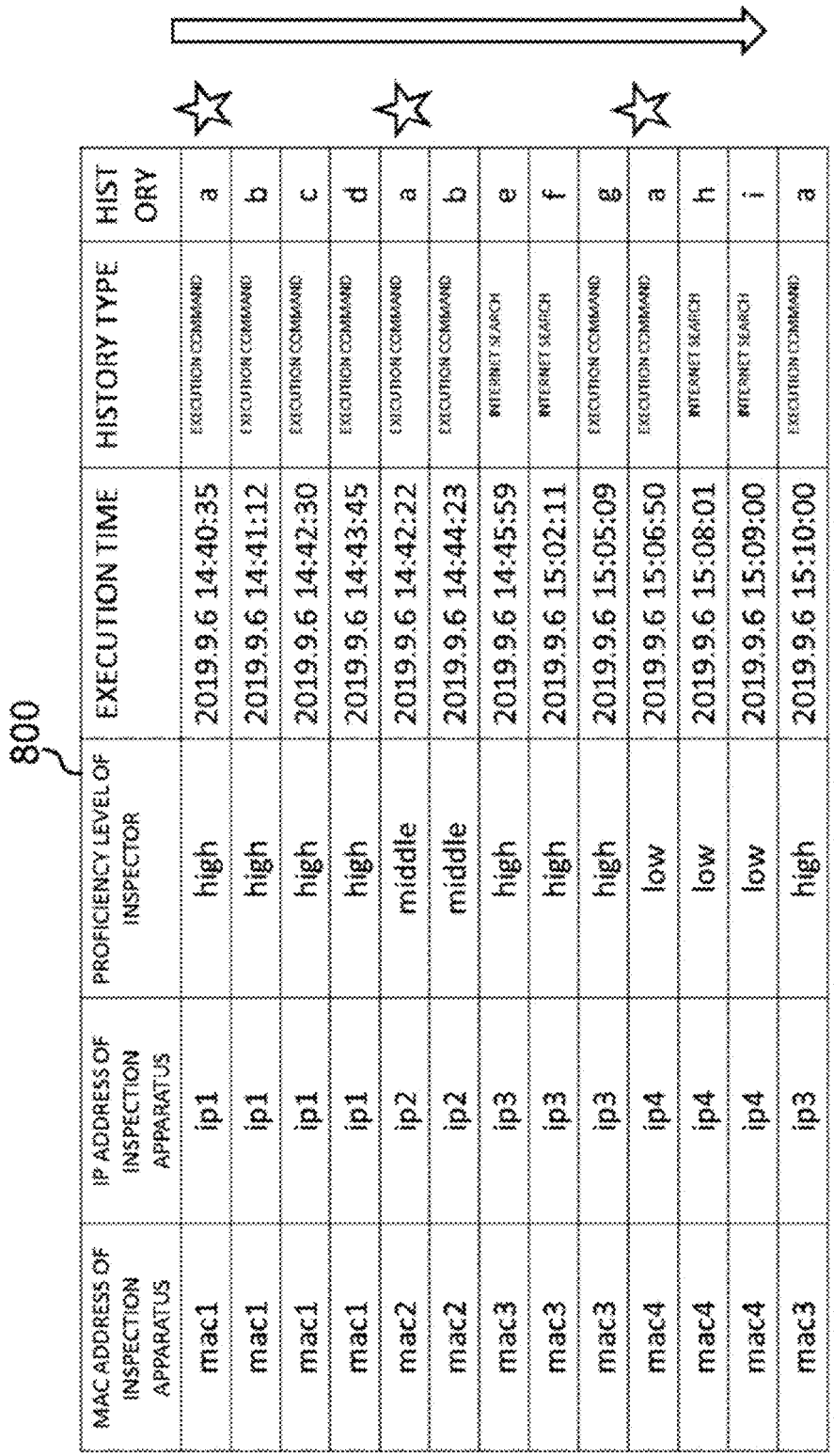
FIG. 8 is a diagram illustrating a concrete example 800 of a correspondence relation between proficiency levels of inspectors using the plurality of inspection apparatuses 200 different from each other in an address (IP address) and activity history information performed by the inspectors.

For example, FIG. 8 is a diagram illustrating a concrete example 800 of a correspondence relation between the proficiency levels of the inspectors operating the plurality of inspection apparatuses 200 different from each other in an address (IP address) and the activity history information performed by the inspection apparatuses 200 in response to the operations of the inspectors.

Referring to FIG. 8, similar to the example illustrated in FIG. 5, the execution command a performed by three inspection apparatuses 200 which are specified by the mac addresses mac1, mac2, and mac4 is specified as the conforming activity information by the inspection support apparatus 100 (specifying section 133).

In this case, the descending order of the proficiency levels of the inspectors operating three inspection apparatuses 200 performing the execution command a is the mac address mac1, mac2, mac4. Accordingly, for example, the inspection apparatus 200 can display the subsequent activity history in priority order as the descending order of the proficiency levels, the mac address mac1, mac2, mac4, by referencing the proficiency level information related to the inspector operating each of the inspection apparatuses 200 performing the security inspections corresponding to two or more respective extracted subsequent activity histories.

3. Second Example Embodiment

Figure 9:
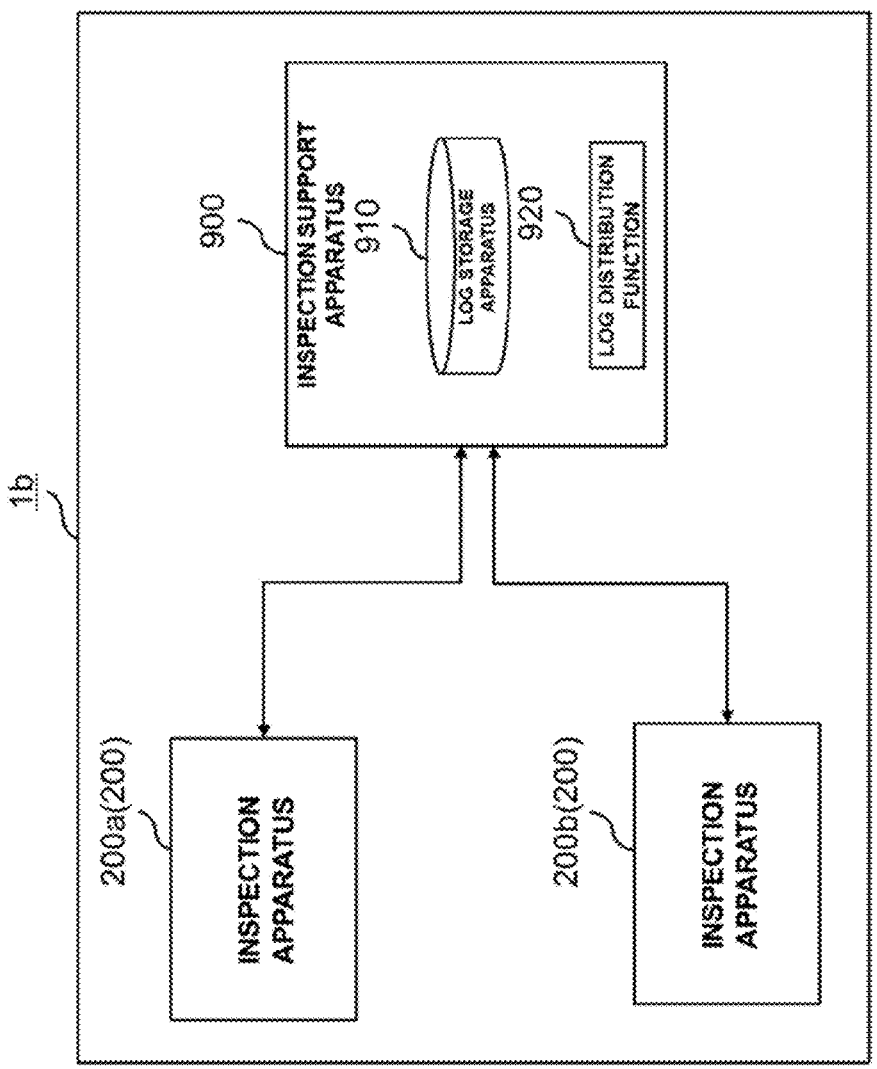
FIG. 9 is a block diagram illustrating an example of a schematic configuration of an inspection management system 1b according to a second example embodiment.

Next, an inspection management system 1b according to a second example embodiment will be described. FIG. 9 is a block diagram illustrating an example of a schematic configuration of the inspection management system 1b according to the second example embodiment.

Referring to FIG. 9, the inspection management system 1b according to the second example embodiment includes the inspection apparatus 200 and an inspection support apparatus 900.

In such an inspection management system 1b, the inspection support apparatus 900 includes a log storage apparatus 910 storing the information related to the activity history transmitted from the inspection apparatus 200, and a log distribution function 920 to distribute the information related to the activity history to the inspection apparatus 200.

3.1. Configuration of Inspection Apparatus 200

Figure 10:
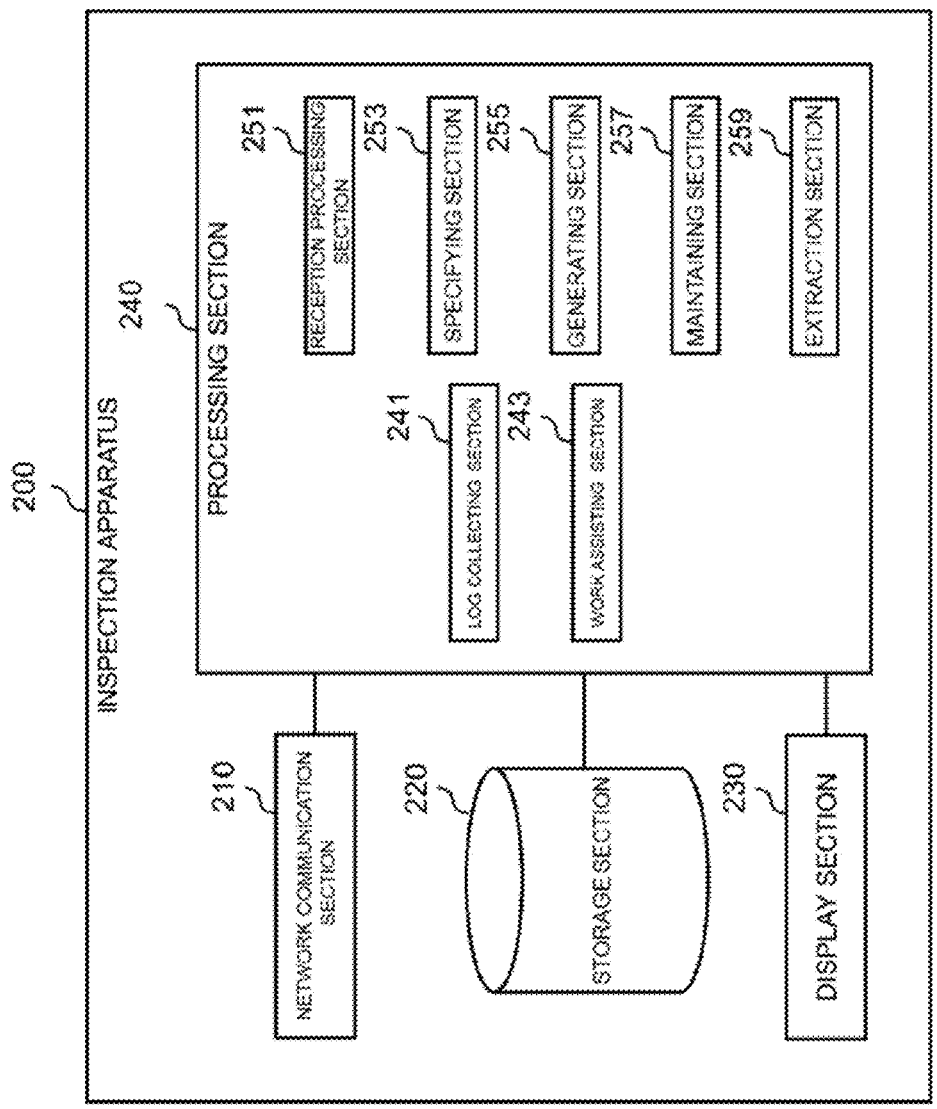
FIG. 10 is a block diagram illustrating an example of a schematic configuration of an inspection apparatus 200 according to the second example embodiment.

The inspection apparatus 200 according to the second example embodiment uses the information related to the activity history distributed by the inspection support apparatus 900 (log distribution function 920) to support the inspector of the inspection apparatus 200. FIG. 10 is a block diagram illustrating an example of a schematic configuration of the inspection apparatus 200 according to the second example embodiment. Referring to FIG. 10, the inspection support apparatus 100 includes a network communication section 210, a storage section 220, a display section 230, and a processing section 240.

(1) Network Communication Section 210

The network communication section 210 receives a signal from a network and transmits a signal to the network.

(2) Storage Section 220

The storage section 220 temporarily or permanently stores programs (instructions) and parameters for operations of the inspection apparatus 200 as well as various data. The programs include one or more instructions for the operations of the inspection apparatus 200.

(3) Display Section 230

The display section 230, which is a display provided to the inspection apparatus 200, displays a processing result of the processing section 240 or the like.

(4) Processing Section 240

The processing section 240 provides various functions of the inspection apparatus 200. The processing section 240 includes a log collecting section 241, a work assisting section 243, a reception processing section 251, a specifying section 253, a generating section 255, a maintaining section 257, and an extraction section 259. Note that the processing section 240 may further include constituent elements other than these constituent elements. In other words, the processing section 240 may also perform operations other than the operations of these constituent elements. The log collecting section 241 and the work assisting section 243 are similar to the log collecting function 201 and the work assist function 202, respectively, included in the inspection apparatus 200 according to the first example embodiment described above, and thus, the description thereof is omitted. Concrete operations of the reception processing section 251, the specifying section 253, the generating section 255, the maintaining section 257, and the extraction section 259 will be described later in detail.

(5) Implementation Example

The network communication section 210 may be implemented with a network adapter and/or a network interface card, and the like. The storage section 220 may be implemented with a memory (e.g., a nonvolatile memory and/or a volatile memory) and/or a hard disk, and the like. The display section 230 may be implemented with, for example, a liquid crystal display, an organic EL display, or the like. The processing section 240 may be implemented with one or more processors. The log collecting section 241, the work assisting section 243, the reception processing section 251, the specifying section 253, the generating section 255, the maintaining section 257, and the extraction section 259 may be implemented with the same processor or may be implemented with separate processors. The memory (storage section 220) may be included in the one or more processors or may be provided outside the one or more processors.

The inspection apparatus 200 may include a memory configured to store programs (instructions) and one or more processors that can execute the programs (instructions). The one or more processors may execute the program and thereby perform operations of the processing section 240 (operations of the log collecting section 241, the work assisting section 243, the reception processing section 251, the specifying section 253, the generating section 255, the maintaining section 257, and/or the extraction section 259). The program may be a program for causing the processor(s) to execute operations of the processing section 240 (operations of the log collecting section 241, the work assisting section 243, the reception processing section 251, the specifying section 253, the generating section 255, the maintaining section 257, and/or the extraction section 259).

3.2. Operation Example

Next, an operation example according to the second example embodiment will be described.

First, the inspection support apparatus 900 (log distribution function 920) periodically or a periodically distributes the information related to the activity history including the command execution history and the Internet search history stored in the log storage apparatus 910 to the inspection apparatus 200. Here, an interval of periodical distribution may be, for example, any predefined interval such as one day.

The inspection support apparatus 900 (log distribution function 920) stores a time of distributing last time the information related to the activity history to the inspection apparatus 200, and distributes, as difference information, the command execution history and the Internet search history stored in the log storage apparatus 910 from the stored time until a current time to the inspection apparatus 200.

On the other hand, the inspection apparatus 200 (reception processing section 251) receives the information related to the activity history distributed by the inspection support apparatus 900 (log distribution function 920). Then, the inspection apparatus 200 (maintaining section 257) maintains the information related to the activity history. In other words, the inspection apparatus 200 (maintaining section 257) stores the information related to the activity history in the storage section 220.

The inspection apparatus 200 can use the information related to the activity history stored in the storage section 220 to specify the conforming activity history and generate the information related to the conforming activity history, similarly to the inspection support apparatus 100 according to the first example embodiment described above.

Specifically, the specifying section 253, the generating section 255, and the extraction section 259 included in the inspection apparatus 200 perform processing of the specifying section 133, the generating section 135, and the extraction section 139 included in the inspection support apparatus 100 according to the first example embodiment described above, respectively.

In this way, the inspection apparatus 200 according to the second example embodiment can even offline share the inspection work assist, in other words, the inspection work know-how of the inspectors, for example.

4. Third Example Embodiment

Subsequently, a third example embodiment of the present invention will be described with reference to FIG. 11. The above-described first and second example embodiments are concrete example embodiments, whereas the third example embodiment is a more generalized example embodiment.

4.1. Configuration of Management Apparatus 1100

Figure 11:
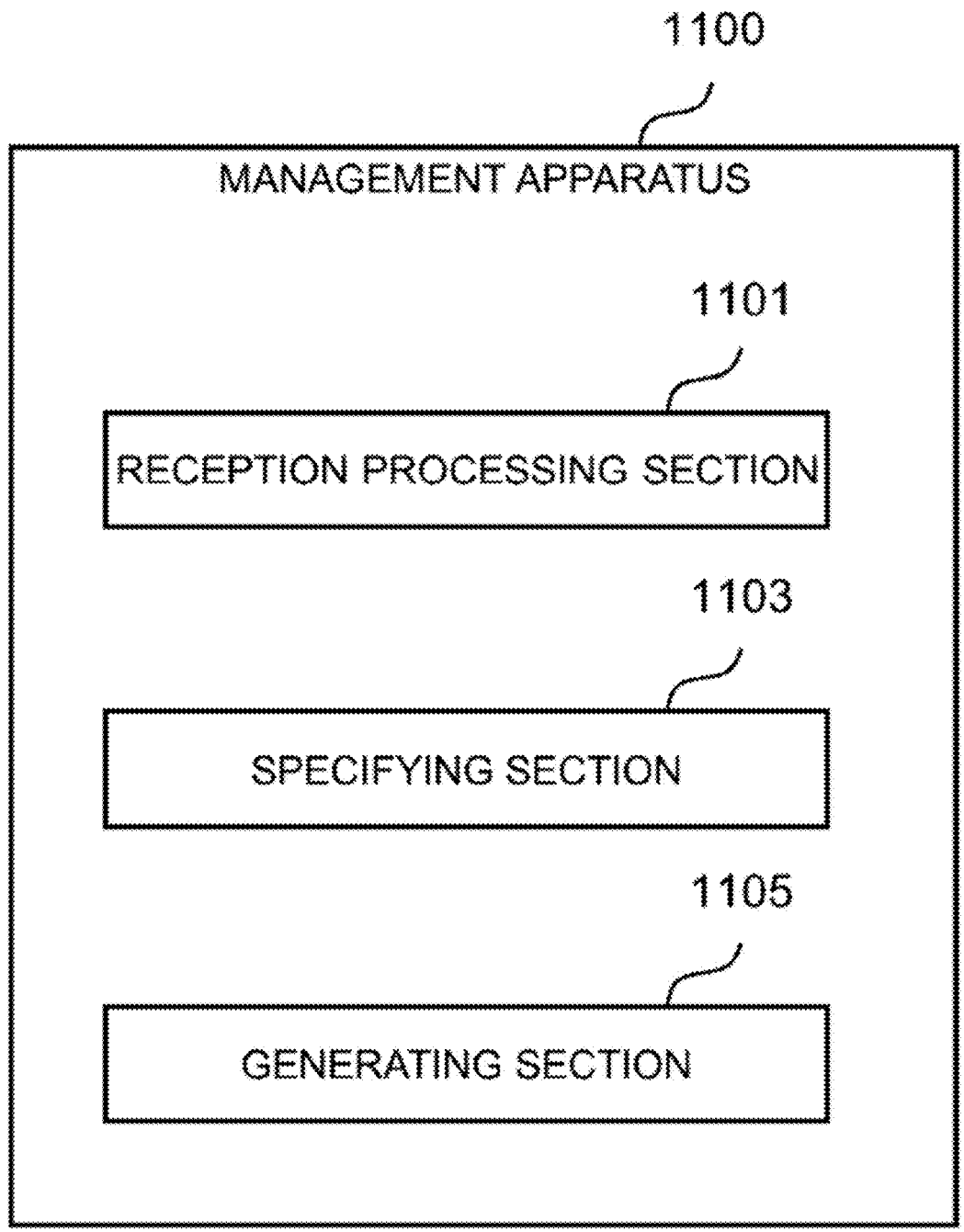
FIG. 11 is a block diagram illustrating an example of a schematic configuration of a management apparatus 1100 according to a third example embodiment.

FIG. 11 is a block diagram illustrating an example of a schematic configuration of a management apparatus 1100 according to the third example embodiment. With reference to FIG. 11, the management apparatus 1100 includes a reception processing section 1101, a specifying section 1103, and a generating section 1105.

The reception processing section 1101, the specifying section 1103, and the generating section 1105 may be implemented with one or more processors, a memory (e.g., a nonvolatile memory and/or a volatile memory), and/or a hard disk. The reception processing section 1101, the specifying section 1103, and the generating section 1105 may be implemented with the same processor or may be implemented with separate processors. The memory may be included in the one or more processors or may be provided outside the one or more processors.

4.2. Operation Example

An operation example according to the third example embodiment will be described.

According to the third example embodiment, the management apparatus 1100 (reception processing section 1101) receives information related to a plurality of activity histories for security inspections performed by a plurality of inspection apparatuses. The management apparatus 1100 (specifying section 1103) specifies a conforming activity history meeting a predetermined correlation condition from the plurality of activity histories. The management apparatus 1100 (generating section 1105) generates information related to the conforming activity history.

Relationship with First Example Embodiment

In an example, the reception processing section 1101 included in the management apparatus 1100 according to the third example embodiment may perform the operation of the reception processing section 131 included in the inspection support apparatus 100 according to the first example embodiment or the reception processing section 251 included in the inspection apparatus 200 according to the second example embodiment. The specifying section 1103 included in the management apparatus 1100 according to the third example embodiment may perform the operation of the specifying section 133 included in the inspection support apparatus 100 according to the first example embodiment or the specifying section 253 included in the inspection apparatus 200 according to the second example embodiment. Furthermore, the generating section 1105 included in the management apparatus 1100 according to the third example embodiment may perform the operation of the generating section 135 included in the inspection support apparatus 100 according to the first example embodiment or the generating section 255 included in the inspection apparatus 200 according to the second example embodiment. In this case, the descriptions of the first and second example embodiments may be applicable to the third example embodiment. Note that the third example embodiment is not limited to this example.

The third example embodiment has been described above. According to the third example embodiment, it is possible to efficiently perform the security inspection.

5. Other Embodiment Examples

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., an obtaining section and/or a configuring section) of the management apparatus described in the Specification (e.g., one or more apparatuses (or units) among a plurality of apparatuses (or units) constituting the management apparatus, or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

Some of or all the above-described example embodiments can be described as in the following Supplementary Notes, but are not limited to the following.

[Supplementary Note 1]

A management apparatus including:

a reception processing section configured to receive information related to a plurality of activity histories for security inspections performed by a plurality of inspection apparatuses;

a specifying section configured to specify a conforming activity history meeting a predetermined correlation condition, from the plurality of activity histories; and a generating section configured to generate information related to the conforming activity history.

[Supplementary Note 2]

The management apparatus according to supplementary note 1, wherein the information related to the conforming activity history includes information related to one or more subsequent activity histories performed for security inspections subsequent to the conforming activity history.

[Supplementary Note 3]

The management apparatus according to supplementary note 2, further including an extraction section configured to extract one or more subsequent activity histories from two or more subsequent activity histories performed for the security inspections subsequently to the conforming activity history, based on the information related to each of the inspection apparatuses performing the security inspections corresponding to the respective subsequent activity histories, wherein the information related to the conforming activity history includes information related to the one or more extracted subsequent activity histories.

[Supplementary Note 4]

The management apparatus according to supplementary note 3, wherein the information related to the inspection apparatus includes a proficiency level calculated based on an inspection history of an inspector, the inspector performing an operation of the inspection apparatus for performing the security inspection, and the extraction section is configured to extract one or more subsequent activity histories from the two or more subsequent activity histories performed for the security inspections subsequently to the conforming activity history, based on the proficiency level of the inspector operating each of the inspection apparatuses performing the security inspections corresponding to the respective subsequent activity histories.

[Supplementary Note 5]

The management apparatus according to supplementary note 4, wherein the extraction section is configured to extract two or more subsequent activity histories from the two or more subsequent activity histories performed for the security inspections subsequently to the conforming activity history, based on the proficiency level of the inspector operating each of the inspection apparatuses performing the security inspections corresponding to the respective activity histories, and the information related to the conforming activity history includes information related to the two or more extracted conforming activity histories, and information related to the proficiency level of the inspector operating each of the inspection apparatuses performing the security inspections corresponding to the two or more respective extracted subsequent activity histories.

[Supplementary Note 6]

The management apparatus according to any one of supplementary notes 1 to 5, wherein each of the plurality of activity histories includes information identifying an execution command for the security inspection.

[Supplementary Note 7]

The management apparatus according to any one of supplementary notes 1 to 6, wherein each of the plurality of activity histories includes information related to an Internet search for the security inspection.

[Supplementary Note 8]

The management apparatus according to any one of supplementary notes 1 to 7, wherein the security inspection is an inspection for a security defect in a security attack against each of the plurality of inspection apparatuses.

[Supplementary Note 9]

The management apparatus according to any one of supplementary notes 1 to 8, further including a transmission processing section configured to transmit the information related to the conforming activity history to one or more inspection apparatuses among the plurality of inspection apparatuses.

[Supplementary Note 10]

The management apparatus according to any one of supplementary notes 1 to 8, further including a maintaining section configured to maintain the information related to the plurality of activity histories, wherein the management apparatus is included in one or more inspection apparatuses among the plurality of inspection apparatuses.

[Supplementary Note 11]

A management method including:

receiving information related to a plurality of activity histories for security inspections from a plurality of inspection apparatuses;

specifying a conforming activity history that meets a predetermined correlation condition from the plurality of activity histories; and generating information related to the conforming activity history.

[Supplementary Note 12]

A program for causing a computer to execute:

receiving information related to a plurality of activity histories for security inspections from a plurality of inspection apparatuses;

specifying a conforming activity history that meets a predetermined correlation condition from the plurality of activity histories; and generating information related to the conforming activity history.

[Supplementary Note 13]

An inspection management system including:

a plurality of inspection apparatuses configured to perform security inspections; and a management apparatus configured to manage related to the plurality of inspection apparatuses, wherein the plurality of inspection apparatuses configured to transmit information related to the plurality of activity histories for security inspections to the management apparatus; and the management apparatus includes a reception processing section configured to receive the information related to the plurality of activity histories for security inspections from the plurality of inspection apparatuses;

a specifying section configured to specifies a conforming activity history meeting a predetermined correlation condition from the plurality of activity histories; and a generating section configured to generates information related to the conforming activity history.

[Supplementary Note 14]

A management method including:

receiving information related to a plurality of activity histories for security inspections from a plurality of inspection apparatuses;

specifying a conforming activity history meeting a predetermined correlation condition from the plurality of activity histories; and generating information related to the conforming activity history.

[Supplementary Note 15]

A program for causing a computer to execute:

receiving information related to a plurality of activity histories for security inspections from a plurality of inspection apparatuses;

specifying a conforming activity history meeting a predetermined correlation condition from the plurality of activity histories; and generating information related to the conforming activity history.

INDUSTRIAL APPLICABILITY

Address information to be a target of access control can be appropriately managed in access management via a communication network access control.

| Reference Signs List | |
|---|---|
| 1a, 1b | Inspection Management System |
| 100, 900 | Inspection Support Apparatus |
| 1100 | Management Apparatus |
| 200, 200a, 200b | Inspection Apparatus |
| 131, 251 | Reception Processing Section |
| 133, 253 | Specifying Section |
| 135, 255 | Generating Section |

What is claimed is:

1. A management apparatus comprising:
a memory storing instructions; and
one or more processors configured to execute the instructions to:
receive information related to a plurality of activity histories for security inspections performed by a plurality of inspection apparatuses;
automatically specify a conforming activity history meeting a predetermined correlation condition that indicates the activity histories satisfying a relation of matching or being similar each other, from the plurality of activity histories;

extract one or more subsequent activity histories from two or more subsequent activity histories performed subsequently to the conforming activity history based on a proficiency level, the proficiency level calculated based on an inspection history of an inspector performing the security inspection;

generate information related to the conforming activity history including information related to the one or more subsequent activity histories; and cause the plurality of inspection apparatus to display information assisting a next action of the inspector performing the security inspection, based on the generated information.

2. The management apparatus according to claim 1, wherein extraction of the one or more subsequent activity histories comprises extraction of a plurality of subsequent activity histories, based on the proficiency level of the inspector operating each of the inspection apparatuses performing the security inspections corresponding to the plurality of subsequent activity histories, and the information related to the conforming activity history includes:

information related to the extracted plurality of subsequent activity histories, and information related to the proficiency level of the inspector operating each of the inspection apparatuses performing the security inspections corresponding to the extracted plurality of subsequent activity histories.

3. The management apparatus according to claim 1, wherein each of the plurality of activity histories includes information identifying an execution command for the security inspection.

4. The management apparatus according to claim 1, wherein each of the plurality of activity histories includes information related to an Internet search for the security inspection.

5. The management apparatus according to claim 1, wherein the security inspection is an inspection for a security defect in a security attack against each of the plurality of inspection apparatuses.

6. The management apparatus according to of claim 1, wherein the one or more processors are further configured to execute the instructions to transmit the information related to the conforming activity history to one or more inspection apparatuses among the plurality of inspection apparatuses.

7. The management apparatus according to claim 1, wherein the one or more processors are further configured to execute the instructions to maintain the information related to the plurality of activity histories, and the management apparatus is included in one or more inspection apparatuses among the plurality of inspection apparatuses.

8. A management method performed by a management apparatus and comprising:

receiving information related to a plurality of activity histories for security inspections performed by a plurality of inspection apparatuses;

automatically specifying a conforming activity history meeting a predetermined correlation condition that indicates the activity histories satisfying a relation of matching or being similar each other, from the plurality of activity histories;

extracting one or more subsequent activity histories from two or more subsequent activity histories performed subsequently to the conforming activity history based on a proficiency level, the proficiency level calculated based on an inspection history of an inspector performing the security inspection;

generating information related to the conforming activity history including information related to the one or more subsequent activity histories; and causing the plurality of inspection apparatus to display information assisting a next action of the inspector performing the security inspection, based on the generated information.

9. A non-transitory computer readable recording medium storing a program executable by a computer to perform processing comprising:

receiving information related to a plurality of activity histories for security inspections performed by a plurality of inspection apparatuses;

automatically specifying a conforming activity history meeting a predetermined correlation condition that indicates the activity histories satisfying a relation of matching or being similar each other, from the plurality of activity histories;

extracting one or more subsequent activity histories from two or more subsequent activity histories performed subsequently to the conforming activity history based on a proficiency level, the proficiency level calculated based on an inspection history of an inspector performing the security inspection;

generating information related to the conforming activity history including information related to the one or more subsequent activity histories; and causing the plurality of inspection apparatus to display information assisting a next action of the inspector performing the security inspection, based on the generated information.

* * * * *